(12) United States Patent
Almutairi et al.

(10) Patent No.: US 12,716,655 B2
(45) Date of Patent: Aug. 25, 2026

(54) DOUBLE EFFECT ABSORPTION COOLING FOR INDUSTRIAL APPLICATIONS

(71) Applicant: Saudi Arabian Oil Company, Dhahran (SA)

(72) Inventors: Faisal B. Almutairi, Dammam (SA); Ali A. Al-Ugla, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 160 days.

(21) Appl. No.: 18/493,393

(22) Filed: Oct. 24, 2023

(65) Prior Publication Data

US 2025/0129989 A1 Apr. 24, 2025

(51) Int. Cl.

*F27D 9/00* (2006.01)
*F25B 15/06* (2006.01)
*C02F 1/28* (2023.01)
*C02F 103/16* (2006.01)

(52) U.S. Cl.

CPC ................ *F27D 9/00* (2013.01); *F25B 15/06* (2013.01); *C02F 1/281* (2013.01); *C02F 2103/16* (2013.01); *F27D 2009/0013* (2013.01)

(58) Field of Classification Search

CPC .... F27D 9/00; F27D 2009/0013; F25B 15/06; C02F 1/181; C02F 2103/16

See application file for complete search history.

(56) References Cited

U.S. PATENT DOCUMENTS 11,131,482 B1 9/2021 Al-Ugla
2010/0107593 A1* 5/2010 Wang ...................... F25B 15/02 60/39.83
2015/0093297 A1* 4/2015 Lu ......................... F26B 23/022 422/168
2017/0350320 A1* 12/2017 Kippel .................... F01D 25/12
2024/0279079 A1* 8/2024 Almutairi ............ B01D 1/0058
2024/0352548 A1* 10/2024 Almutairi ............... F27D 17/10

FOREIGN PATENT DOCUMENTS

CN 103322608 9/2013
CN 115218247 A * 10/2022 ............... F24D 3/10

OTHER PUBLICATIONS

CN115218247A machine translation (Year: 2022).*
Al Mousawi et al., "Adsorption System for Cooling and Power Generation Using Advanced Adsorbent Materials," Thesis submitted for the degree of Doctor of Philosophy, University of Birmingham, Feb. 2018, 320 pages.
Farshi et al., "Analysis of crystallization risk in double effect absorption refrigeration systems," Applied Thermal Engineering, Mar. 2011, 31:1712-1717, 6 pages.

(Continued)

*Primary Examiner* — Marc E Norman
(74) *Attorney, Agent, or Firm* — Fish & Richardson P.C.

(57) ABSTRACT

Systems for cooling a steelmaking plant can include a heat recovery unit with a gas inlet receiving flue gases from production processes of the steelmaking plant. A wastewater treatment unit has an inlet receiving waste water from the production processes of the steelmaking plant and a clean water outlet hydraulically connected to a cooling water inlet of the heat recovery unit. An absorption cooling unit has an inlet hydraulically connected to a hot water discharge of the heat recovery unit.

9 Claims, 2 Drawing Sheets

(56) References Cited

OTHER PUBLICATIONS

Sztekler et al., "Using Adsorption Chillers for Utilising Waste Heat From Power Plants," Thermal Science, 2019, 23(4):1143-1151, 9 pages.
Ullah et al., "A review of solar thermal refrigeration and cooling methods," Renewable and Sustainable Energy Reviews, Apr. 2013, 24:499-513, 15 pages.
Wang et al., "Energy Saving Technologies and Mass-Thermal Network Optimization for Decarbonized Iron and Steel Industry: A Review," Journal of Cleaner Production, Jul. 2020, 274:122997, 28 pages.

* cited by examiner

DOUBLE EFFECT ABSORPTION COOLING FOR INDUSTRIAL APPLICATIONS

TECHNICAL FIELD

This specification relates to cooling steel plants, in particular to using waste heat in steel plants to generate electricity to power cooling systems.

BACKGROUND

Waste heat is heat that is produced by a machine, or other process that uses energy, as a byproduct of doing work. Typically, waste heat has lower utility than the original energy source. Sources of waste heat include human activities and natural systems including, for example, incandescent light bulbs, refrigerators, internal combustion engines, and metal production. Sometimes waste heat is used by another process such as, for example, heat recovery ventilation in a building.

SUMMARY

This specification describes an approach to using waste heat and wastewater generated in steel production to provide cooling for steel production plants. Plants using electric arc furnaces (EAF) release approximately 100-200 kilowatt hours (kWh)/ton liquid steel of waste heat and use approximately 1.6 to 3.3 cubic meters ($m^3$)/ton considering evaporation and other water losses sources. The systems and methods described in this specification uses the otherwise wasted energy and water to produce cooled air to cool portions of steel production plant.

The approach described in this specification can provide one or more of the following advantages.

Flue gases from EAFs are traditionally treated and cooled down to 250° C. in a flue gas treatment center before being rejected. The systems and methods described in this specification combine this cooling operation with energy recovery to produce high quality steam or electricity. This approach uses the otherwise wasted energy and water to produce cooled air to cool portions of steel production plant providing significant cost savings. It can enhance the overall all energy efficiency of the plant by enhancing the water management system as well as reducing operating expenditures (OPEX) by eliminating the HVAC costs which normally accounts for 15%-20% of the total annual OPEX.

In contrast to earlier work, this approach integrates both water treatment and waste heat recovery. In particular, this approach in providing buildings with cooling need in high temperature environments. In addition, these systems and methods reuse most of the wastewater for air cooling system.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

This specification describes an approach to using waste heat and wastewater generated in steel production to provide cooling for steel production plants. Plants using electric arc furnaces (EAF) release approximately 100-200 kilowatt hours (kWh)/ton liquid steel of waste heat and use approximately 1.6 to 3.3 cubic meters ($m^3$)/ton considering evaporation and other water losses sources. The systems and methods described in this specification uses the otherwise wasted energy and water to produce cooled air to cool portions of steel production plant.

This approach integrates on grid energy optimization (i.e., the system will be integrated with the grid to help maintain business continuity) in which the plant wastewater treatment system, and the air-cooling system in steel mill to use a heat recovery system to power the air-cooling system. The integrated system provides significant electricity and process water savings, carbon emission reduction, and required cooled air for buildings in steel plant. The integrated system includes two main systems. The first system is a wastewater treatment system uses a mix of physical and chemical separation methods to ensure meeting the required water quality standards. The second system is double effect absorption air cooling system that utilize a generator, condenser, absorber and evaporator to produce cooled air matching the required thermal comfort in buildings of the steel plant.

Figure 1:
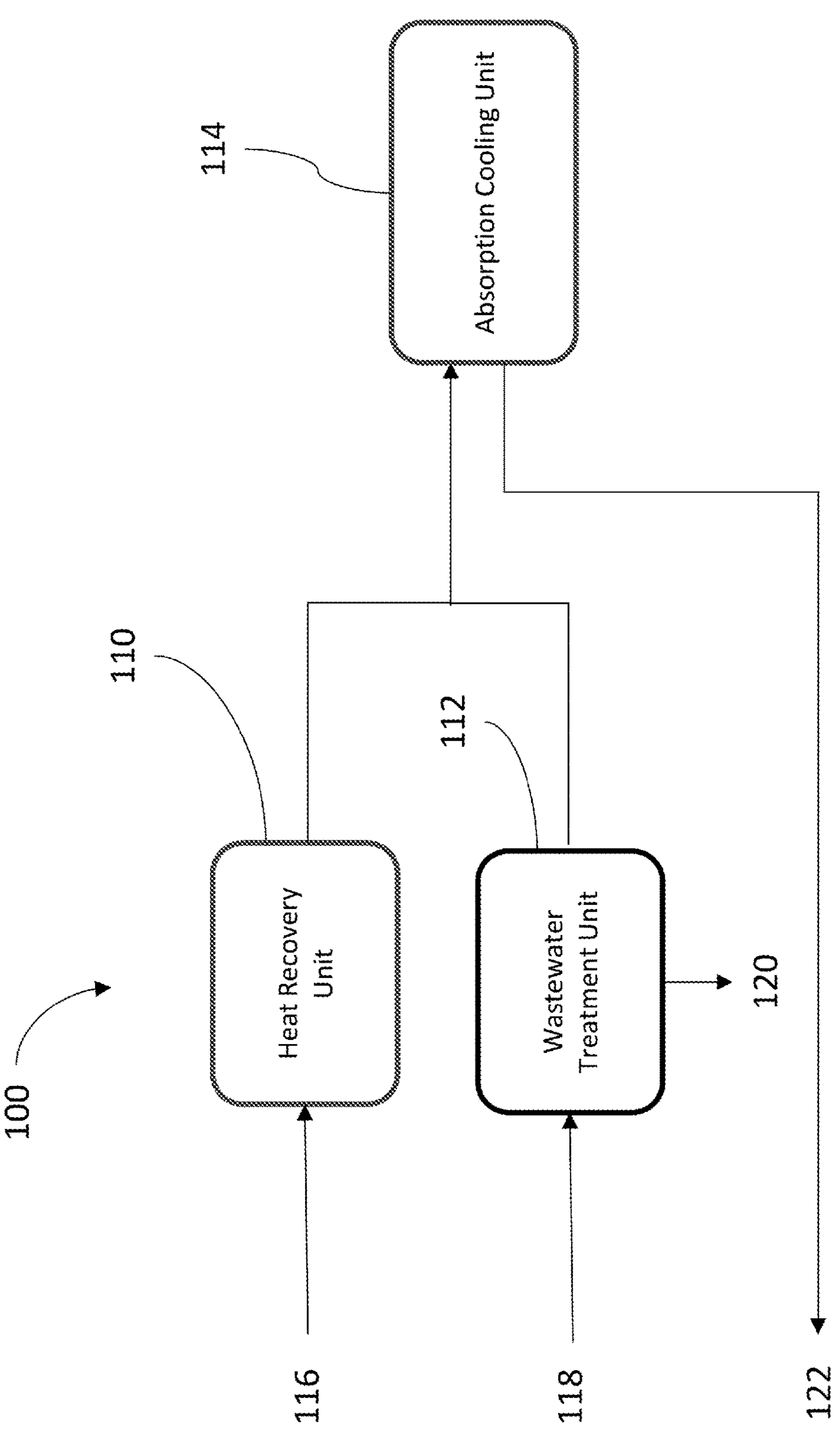
FIG. 1 is a general high level schematic of a system using waste heat and wastewater generated in steel production to provide cooling for a steel production plant.

FIG. 1 is a general high level schematic of a system 100 using waste heat and wastewater generated in steel production to provide cooling for a steel production plant. The system 100 includes a heat recovery unit 110 and a wastewater treatment unit 112 of a steel production plant. The heat recovery unit 110 and the wastewater treatment unit 112 provide, respectively, heat and water to an absorption cooling unit 114.

The heat recovery unit 110 receives waste heat 116 (e.g., in the form of flue gases) from the production processes. In the heat recovery unit 110, the flue gases are cooled from approximately 250-300 degrees Celsius (° C.) to approximately 200° C. before being discharged to the environment. In some implementations, this cooling is performed using clean water generated by the wastewater treatment unit 112. The heated water can then be used as an energy source to drive the absorption cooling unit 114. The treated water will be heated by heat exchanging processes taking place in the heat recovery unit during which the water is heated and the temperature of the steam is decreased.

The wastewater treatment unit 112 receives used process water from the production facilities and produces water clean enough to use as cooling water in the heat recovery unit 110 and a concentrated waste stream for disposal 120. The wastewater is treated to achieve the quality requirements for industrial utilization that is defined as per EPA standards "The use of reclaimed water in industrial applications and facilities, power production, and extraction of fossil fuels".

The absorption cooling unit 114 uses a generator, a condenser, an absorber, and an evaporator to produce cooled air 122 matching the thermal requirements of occupants of buildings of the steel plant. The details of the components and operation of the absorption cooling unit 114 are described in more detail with reference to FIG. 2.

Figure 2:
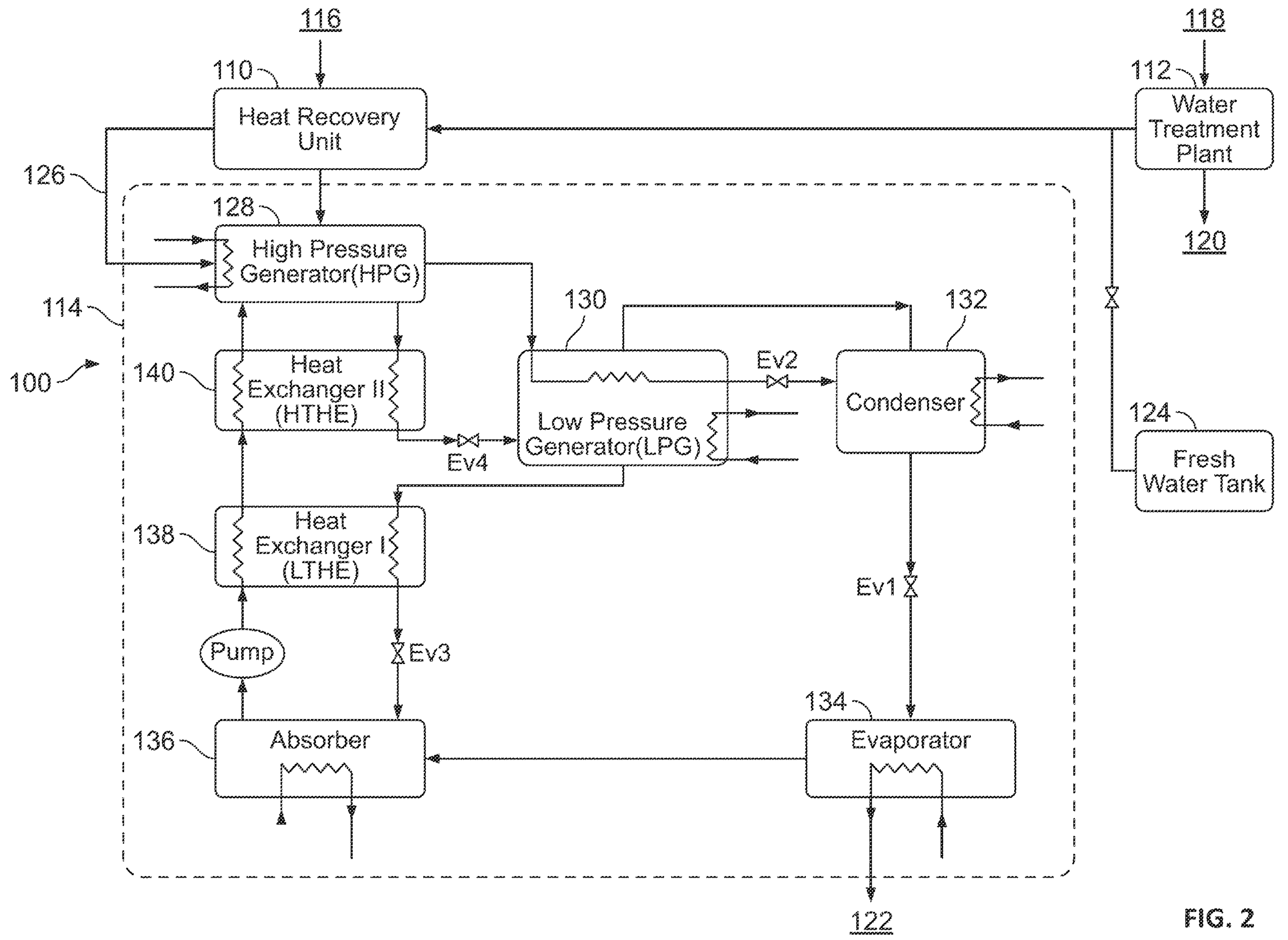
FIG. 2 is a schematic of an example system modeled for a steelmaking plant with capacity of 0.5 million ton/year of liquid steel production.

FIG. 2 is a schematic of an example implementation of the system 100 modeled for a steelmaking plant with capacity of 0.5 million ton/year of liquid steel production. As described with respect to FIG. 1, the system 100 includes the heat recovery unit 110, the wastewater treatment unit 112, and the absorption cooling unit 114. Although the example implementation includes a double effect absorption system, some systems are implemented with other absorption systems (e.g., single effect absorption systems or triple effect absorption systems).

Absorption cooling systems use a heat source (e.g., solar energy, a fossil-fueled flame, or waste heat) to provide the energy needed to drive the cooling process. In contrast to vapor-compression cooling, absorption cooling systems use low-grade or waste thermal energy to provide cooling and do not require a compressor. Instead of using a compressor to compress refrigerant to high pressure, absorption cooling systems use heat exchangers and chemical absorption.

These systems use two coolants. A first coolant performs evaporative cooling and then is absorbed into the second coolant. Heat from outside the system is used to reset the two coolants to their initial states. Common working fluids include ammonia-water solutions and lithium bromide-water solutions. In ammonia-water absorption cooling systems, ammonia acts as the refrigerant and water is the absorbent. In lithium bromide-water cooling systems, water acts as the refrigerant and lithium bromide is the absorbent. These mixtures are selected on the basis of low boiling points and operating pressures and temperatures.

In the modeled implementation, the heat recovery unit 110 receives waste heat 116 in the form of flue gases from the production processes. As discussed above, the flue gases are cooled from 250-300° C. to approximately 200° C. before being discharged to the environment. The cooling is performed using clean water generated by the wastewater treatment unit 112.

The water is heated as the flue gases are cooled. The heated water 126 is then used as an energy source to drive the absorption cooling unit 114. The heated water is used feed water for the high-pressure generator.

The wastewater treatment unit 112 receives used process water from the production facilities and produces water clean enough to use as cooling water in the heat recovery unit 110 and a concentrated waste stream for disposal 120. In this implementation, the system also includes a fresh water tank 124. The fresh water tank provides a backup water supply for times when the water flow from the water treatment unit 112 is not sufficient to supply the cooling system with the amount of water.

The absorption cooling unit 114 is a series flow double effect lithium bromide-water absorption refrigeration system. It has three pressure levels, i.e. high, medium and low. The high-pressure generator 128 operates at high pressure and high temperature, the low-pressure generator 130 and the condenser 132 operate at medium pressure, and the evaporator 134 and the absorber 136 work at low pressures.

In the context of absorption cooling units, "strong solution" refers to mixtures in which the refrigerant concentration is high and "weak solution" refers to mixtures in which the refrigerant concentration is reduced.

The absorber 136 is where the refrigerant is dissolved back into other coolant and, consequently, the discharge from the absorber 136 is where the fluid is the strongest. The weak solution sucks water vapor out of the evaporator 134 providing a low partial pressure.

The strong solution from the absorber 136 is pumped through a low temperature heat exchanger 138 and a high temperature heat exchanged 140 to the high pressure generator 128. The heated water 126 from the heat recovery unit 110 heats the strong solution generating water vapor while leaving the lithium bromide and some residual water as the weak solution. The weak solution is routed through the high temperature heat exchanger 140 and an expansion valve to the low pressure generator 130. Water vapor from the high pressure generator 128 is routed through the low pressure generator 130 to the condenser 132.

In the low pressure generator 130, the water vapor coming from the high pressure generator 128 is condensed due to the low temperature of the weak solution and its latent heat generates more water vapor from the weak solution. In some implementations, low grade energy in addition to this latent heat is supplied to the LPG to produce more vapor. The weak solution becomes weaker and is delivered to the absorber 136 through the low temperature heat exchanger 138 and solution expansion valve. Water vapor generated from both the high pressure generator 128 and the low pressure generator 130 passes to the condenser 132 and heats the cooling stream as it condenses. Treated water is used as the cooling stream cooling the water vapor to liquid.

The liquid refrigerant (i.e., water) is delivered to the evaporator 134 through an expansion valve where its pressure is reduced to that of the evaporator 134. The water evaporates in a low partial pressure environment extracting heat air routed through the evaporator 134. Because of the low partial pressure, the temperature needed for evaporation is also low.

The system 100 was modeled for a steelmaking plant with capacity of 0.5 million ton/year of liquid steel production. The saving is based on Saudi Arabia water tariffs rates. The calculated results included (1) $35 million/year savings due to recovering the water required for the heat recovery process from the water treatment plant; (2) a 40% reduction in electrical energy annual bills; (3) a 15% reduction in carbon emissions; and (3) a 45% reduction in operational costs by use of around 150,000 $m^3$/year of process wastewater.

EXAMPLES

In an example implementation, a system for cooling a steelmaking plant, the system includes: a heat recovery unit with a gas inlet receiving flue gases from production processes of the steelmaking plant; a wastewater treatment unit with an inlet receiving waste water from the production processes of the steelmaking plant and a clean water outlet hydraulically connected to a cooling water inlet of the heat recovery unit; and an absorption cooling unit with an inlet hydraulically connected to a hot water discharge of the heat recovery unit.

In an aspect combinable with the example implementation, the absorption cooling unit can be a double effect absorption system. In some cases, the absorption cooling unit is an ammonia-water absorption system. In some cases, the absorption cooling unit is a lithium bromide-water absorption system.

Another aspect combinable with any of the previous aspects, the system also includes a fresh water tank hydraulically connected to the clean water outlet of the wastewater treatment unit.

A number of embodiments of the systems and methods have been described. Nevertheless, it will be understood that various modifications may be made without departing from the spirit and scope of this specification. For example, although described with reference to a steel production plant, this approach can be used in other facilities (e.g., oil and gas separation plants, refineries, and petrochemical processing plants) that generate both the waste heat and wastewater necessary to implement these systems and methods. Accordingly, other embodiments are within the scope of the following claims.

What is claimed is:

1. A system for cooling a steelmaking plant, the system comprising:

a heat recovery unit with a gas inlet receiving flue gases from production processes of the steelmaking plant;

a wastewater treatment plant with an inlet receiving waste water from the production processes of the steelmaking plant and a clean water outlet hydraulically connected to a cooling water inlet of the heat recovery unit; and an absorption cooling unit with an inlet hydraulically connected to a hot water discharge of the heat recovery unit.

2. The system of claim 1, wherein the absorption cooling unit comprises a double effect absorption system.

3. The system of claim 2, wherein the absorption cooling unit is ammonia-water absorption system.

4. The system of claim 2, wherein the absorption cooling unit is lithium bromide-water absorption system.

5. The system of claim 1, further comprising a fresh water tank hydraulically connected to the clean water outlet of the wastewater treatment plant.

6. A system for cooling a steelmaking plant, the system comprising:

a heat recovery unit with a gas inlet receiving flue gases from production processes of the steelmaking plant;

a wastewater treatment plant with an inlet receiving waste water from the production processes of the steelmaking plant and a clean water outlet hydraulically connected to a cooling water inlet of the heat recovery unit;

an absorption cooling unit with an inlet hydraulically connected to a hot water discharge of the heat recovery unit; and a fresh water tank hydraulically connected to the clean water outlet of the wastewater treatment plant.

7. The system of claim 6, wherein the absorption cooling unit comprises a double effect absorption system.

8. The system of claim 7, wherein the absorption cooling unit is ammonia-water absorption system.

9. The system of claim 7, wherein the absorption cooling unit is lithium bromide-water absorption system.

* * * * *